Feb. 20, 1940.　　　R. V. HANCHETT　　　2,190,920
POWER OPERATED SAW SWAGE
Filed Nov. 7, 1938　　　2 Sheets-Sheet 1
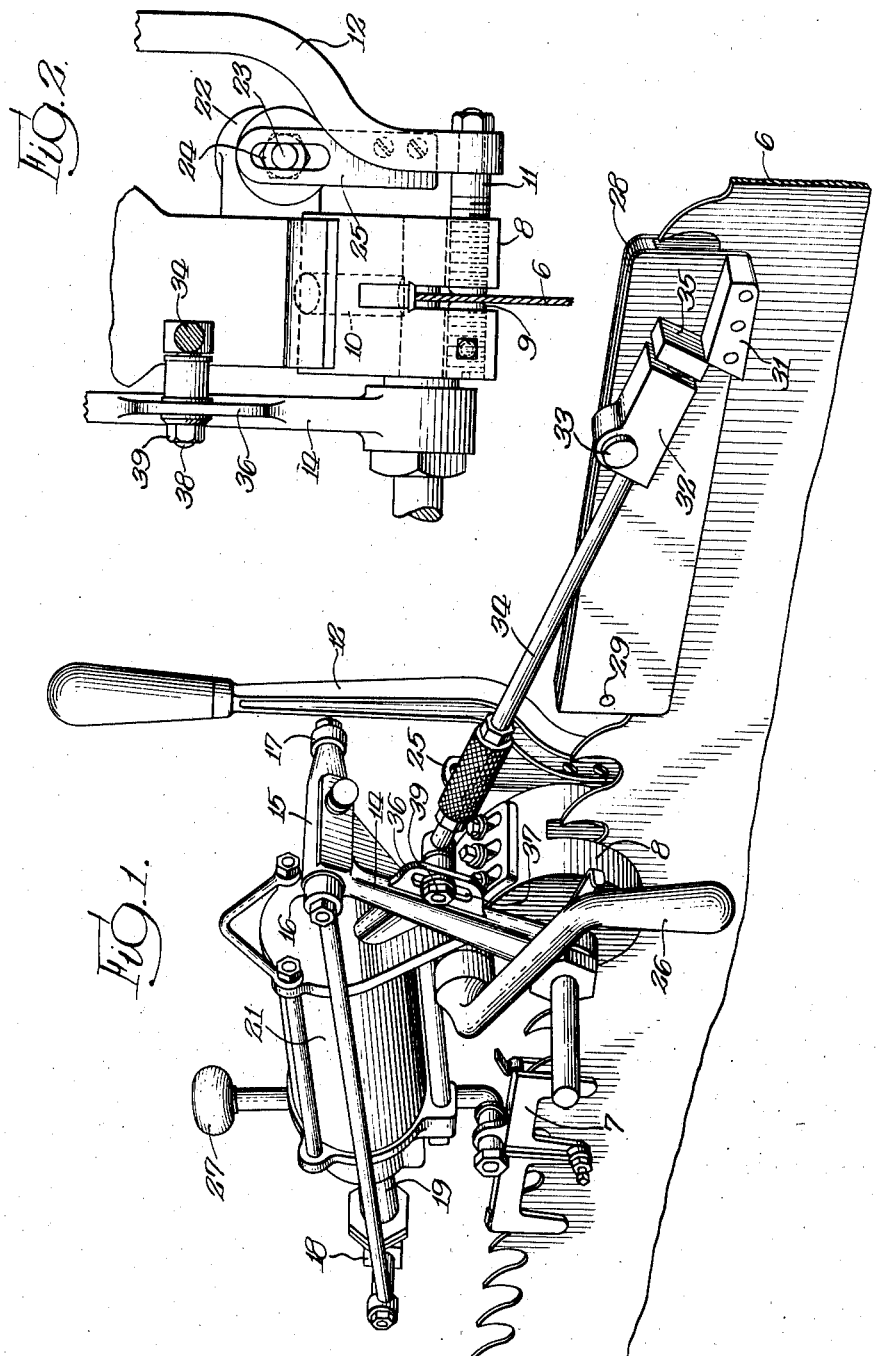
INVENTOR.
Ralph V. Hanchett,
BY
ATTORNEY.

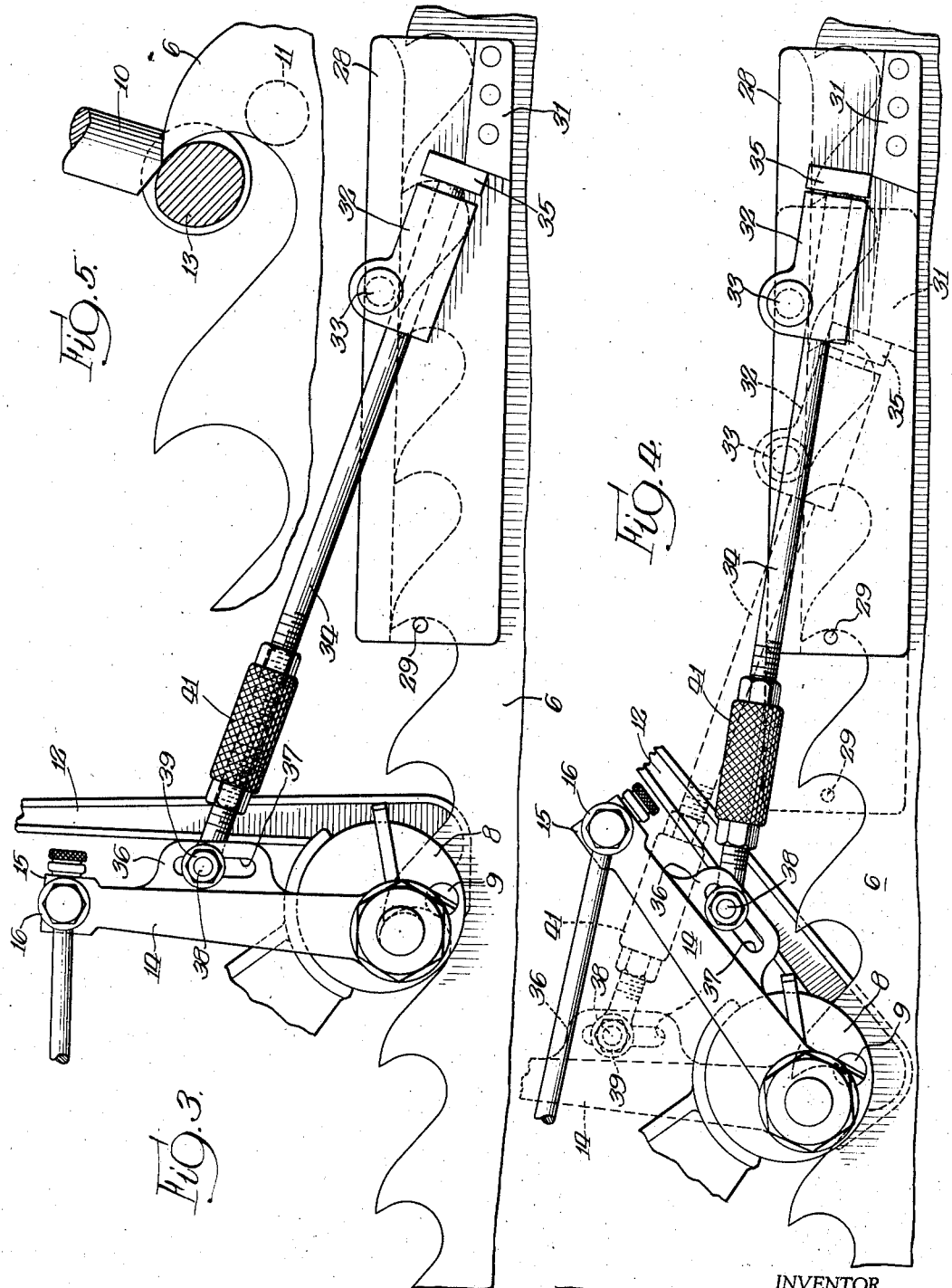

Patented Feb. 20, 1940

2,190,920

UNITED STATES PATENT OFFICE 2,190,920

POWER OPERATED SAW SWAGE

Ralph V. Hanchett, Big Rapids, Mich., assignor to Hanchett Manufacturing Co., Big Rapids, Mich., a corporation of Michigan Application November 7, 1938, Serial No. 239,203

7 Claims. (Cl. 76—54)

This invention relates to swages for widening the tips of saw teeth and has more particular reference to swages designed for the treatment of the teeth of band saws.

Swages for this purpose may be either manually operated or power operated, but in the use of either type prior to my invention, it has been necessary to move the swage from tooth to tooth along the saw by hand power. The power operated swages which embody a power cylinder and mechanism operable thereby are quite heavy and cumbersome, and the repeated advancing of the swage from tooth to tooth along the saw involves considerable manual effort and becomes a laborious and tiresome task when continued for a protracted period.

The primary purpose of my present invention is to provide a swage of this character with means for automatically advancing it from tooth to tooth along the saw without the expenditure of manual effort and without interfering with the operative mechanisms of the swage.

Another purpose of the invention is to provide a swage advancing device which may be incorporated in the construction of the swage as manufactured or may be produced with slight modification for attachment to existing swages.

Other purposes and advantages of my invention should be readily appreciated as the same becomes better understood by reference to the following description when considered in connection with the accompanying drawings.

Referring to the drawings:

Fig. 1 is a perspective view of a swage equipped with my invention;

Fig. 2 is a transverse view looking toward the right hand end of the swage of Fig. 1;

Fig. 3 is a fragmentary side elevation illustrating one position of the swage advancing attachment;

Fig. 4 is a similar view showing the parts in a different position; and

Fig. 5 is a fragmentary view showing the swage dies.

Referring to the drawings more in detail, reference character 6 indicates a band saw upon which the swage is shown as positioned in use. The swage, as shown, comprises a support for the front end of the swage in the form of a shoe 7 adapted to rest upon the saw teeth and be moved along the saw, the shoe being provided with spaced apart, depending guide swings straddling the saw to hold the shoe in position thereon.

A swaging head 8 disposed rearwardly of the shoe is equipped with a stationary lock screw 9 and a rotatable clamping screw 11 carrying a hand lever 12 by which the screw 11 may be turned to lock the swage to the saw by clamping the saw between the screws 9 and 11. The head 8 is also equipped with the adjustable anvil 10 and the rotatable eccentric die 13 between which die and anvil the point of the saw tooth is compressed to perform the swaging as the die is rotated in a counter-clockwise direction viewing Fig. 5. The shaft carrying the eccentric die is provided outside the head 8 with a lever arm 14 equipped at its upper end with a cross head 15 to which the rear ends of connecting rods 16 and 17 are attached. The forward ends of these rods are connected with a front cross head 18 carried by the projecting end of piston rod 19 which extends into the cylinder 21 where it is provided with the usual piston.

Air under pressure is supplied from any suitable source alternately to the opposite ends of the cylinder for moving the piston and connected parts alternately in opposite directions. Valve mechanism for controlling the admission and exhaust of air to and from the cylinder is contained within a valve housing 22 and is operated through a rod 23 projecting from the rear end of the housing. An adjustable abutment 24 in the form of a nut is carried by the rod in position to be engaged by an arm 25 carried by the lever 12, so that when the lever is swung forwardly or to the left viewing Fig. 1, the valve mechanism is operated to admit air into the rear end of the cylinder to thereby swing the swaging lever 14 forwardly, and when lever 12 is swung rearwardly, the valve rod 23 is projected outwardly from the housing by a spring.

The mechanism thus far described may be of conventional structure, as illustrated, or may be of special design, but in either event, its mode of operation is a matter of common knowledge in the trade. In operating a swage of this type, the common practice is for the operator to grasp the handle 26 in one hand and lever 12 or the knob 27 in the other in order to move the swage along the saw to bring the die into cooperative relation with the successive saw teeth. When the swage has been moved forwardly the distance of a tooth, it is then drawn rearwardly a slight distance to dispose the tooth point snugly between the eccentric die and the anvil, as exemplified in Fig. 5. Thereupon, the clamping lever 12 is swung upwardly and to the left to the position shown in Fig. 1 to clamp the swage to the saw through the medium of the clamping screw 11. This movement of the clamping lever 12 admits air under pressure to the rear end of cylinder 21 which moves the piston to the left viewing Fig. 1 and through the connecting rods 16 and 17 swings the die lever 14 into substantially vertical position to subject the saw tooth point to compression between the eccentric die 13 and the anvil 10. The lever 12 is then swung to the right to unclamp the swage from the saw and permit the air control valve to be reversed by a spring (not shown). The piston is thereupon moved by air pressure to the right viewing Fig. 1, thereby rocking the die lever 14 rearwardly and downwardly to withdraw the eccentric die from the tooth point, whereupon the swage may be moved forwardly over the next tooth and then slightly retracted to position such tooth between the die and the anvil. The clamping and swaging operations above described are then repeated, and this method is continued until each tooth of the saw has been swaged.

As has been previously stated, the moving of the rather heavy swage forward from tooth to tooth involves the expenditure of considerable physical effort, and the swaging of a long saw consequently becomes a laborious task. My present invention aims to eliminate the physical labor heretofore required in advancing the swage along the saw by providing an advancing mechanism which automatically performs this operation.

With this end in view, I have provided a shoe 28 adapted to straddle and rest upon the upper edge of the saw rearwardly of the swage. A pin 29 extending transversely of the saw receiving slot near the forward end of the shoe is adapted to engage the front edge of a tooth, as indicated in Fig. 3, to thereby prevent rearward movement of the shoe along the saw. An abutment block 31 is mounted on one outer face of the shoe near the rear end thereof, and a rod guide 32 is pivoted to the shoe at 33 forwardly of and above the block. A thrust rod 34 extends through the guide 32 and is provided at its rear end with a head 35 adapted to abut the block 31, as illustrated in Fig. 3. The forward end of the thrust rod is connected to the die lever in any suitable manner, and when the device is applied to existing swages, it may be attached to the lever by means of a clamp or other suitable means. In the present instance, however, the lever is shaped for the connection thereto of the rod by forming thereon a web 36 provided with a slot 37 for the reception of a pin or stud 38 which is clamped in adjusted position by a nut 39. The forward end of thrust rod 34 is pivoted on this pin or stud, as will be apparent from Fig. 1. For purposes of adjustability so that the length of rod 34 may be accommodated to the spacing of the teeth in various saws, a turnbuckle 41 is incorporated in the structure of the rod.

A swage equipped with the advancing attachment just described is automatically advanced, when in operation, in the following manner. Assuming that the parts are in the swaging position shown in Figs. 1 and 3, the swaging operation having just been performed by swinging the lever 14 to substantially vertical position, as indicated in Fig. 3, the lever 12 is now swung to the right to release the clamping screw 11 from the saw and permit the air control valve to be spring actuated into reverse position. The air operated piston in the cylinder 21 is now moved rearwardly, thereby swinging lever 14 rearwardly and downwardly to the position shown in full lines in Fig. 4. This movement first releases the eccentric die from the saw tooth, and then by reason of the thrust exerted through thrust rod 34 against the abutment block 31 causes the swage to be advanced a distance of one tooth along the saw, the shoe 28 carrying the block 31 being held against rearward movement on the saw by the pin 29. When the swage has been advanced a sufficient distance to carry the die 13 over the point of the next tooth so that it may then drop downwardly in front of the tooth, the downward movement of the forward end of thrust rod 34 elevates the head 35 about the pin 33 as a fulcrum sufficiently to cause it to clear the block 31, as illustrated in Fig. 4. This permits the swage to be manually moved rearwardly on the saw the short distance necessary to bring the point of the tooth to be swaged snugly between the die and the anvil.

The clamping lever 12 may now be swung to upright position to clamp the swage to the saw and reverse the air supply valve, thereby causing the lever 14 to be swung forwardly. Upon forward swinging movement of this lever, the shoe 28 is dragged forwardly by the rod 34 approximately the distance of a saw tooth spacing to cause pin 29 to ride over the next tooth and drop down in front of it, as shown in dotted lines in Fig. 4. The upward movement of the forward end of thrust rod 34 again positions the head 35 in alignment with thrust block 31 so that upon reverse or rearward movement of lever 14, the shoe 28 is first moved rearwardly a short distance which is terminated by engagement of pin 29 with the front of a tooth, whereupon advancing movement of the swage in the manner above described is repeated.

It should be apparent from the foregoing that I have provided a swage attachment by which a swage is automatically advanced along the saw at each operation of the mechanism, thereby eliminating the manual labor heretofore required in advancing the swage, increasing the speed of operation, and rendering the task much easier of performance. The structural details illustrated and described may obviously be varied within considerable limits without departing from the essence of the invention as defined in the following claims.

I claim:

1. The combination with a swaging device comprising a die, an operating lever therefor and means for actuating said lever, of a shoe provided with an abutment, a rod connected at one end to said lever and pivotally and slidably supported intermediate its ends on the shoe, said rod being aligned and disaligned with said abutment upon movements of said lever in opposite directions, and a pin for preventing retrograde movement of said shoe along the saw.

2. The combination with a swaging device comprising a swaging die, an operating lever therefor, and means for actuating said lever, of means operable by said lever for intermittently advancing said swaging device along a saw being swaged between successive operations of said die, said means including a shoe straddling the saw, a pin for limiting rearward movement of the shoe with respect to the saw, an abutment block carried by the shoe, a rod guide pivoted on the shoe, and a rod slidable in said guide and connected with said lever, the parts being so arranged and proportioned that upon movement of the lever to swaging position the shoe will be advanced upon the saw, and upon movement of the lever in the opposite direction the swaging device will be advanced along the saw by cooperative action between the rod and the abutment block, and upon completion of said advancing movement the cooperative relation between the rod and block will be disestablished to permit rearward positioning movement of said swaging device.

3. The combination with a saw swage, a member slidable upon the saw and engageable with a tooth to prevent retrograde movement thereof along the saw, and connections between said swage and said member for forwardly advancing the swage past a tooth to be swaged, said connections including a plurality of elements which coact to effect said advance and are adapted to be disengaged upon advancement of the swage past a saw tooth, whereby the swage is freed for final independent adjusting movement.

4. The combination with a swaging device including a swaging die, a lever for operating the same and means for actuating said lever, of advancing means including a shoe supported on the saw being swaged, and connections between said shoe and said lever whereby the swaging device and the shoe are alternately thrust forwardly along the saw and past successive teeth by actuations of the lever in opposite directions, said connections being operable upon advancement of the swaging device past a tooth to release the swaging device from forward thrust whereby to permit reverse movement of the swaging device into swaging position relative to said tooth.

5. The combination with a swaging device including a die, a die operating lever and means for actuating said lever, of means operable by said lever for advancing said swaging device forwardly along the saw past successive teeth between successive swaging operations, said means including a shoe provided with means for holding the shoe against reverse movement along the saw being swaged, and connections between said shoe and said lever whereby upon movement of the lever in one direction the shoe is advanced forwardly along the saw upwardly and over the next tooth while the swaging device remains stationary, but upon movement of said lever in the opposite direction the swaging device is advanced forwardly along the saw upwardly and over the next unswaged tooth while the shoe remains stationary, said connections including a member movable into a position to break the connection when the swaging device rides over the next unswaged saw tooth, thereby permitting reverse movement of the swaging device into swaging position.

6. The combination with a saw swage, a member forwardly slidable upon the saw and engageable with a tooth to prevent retrograde movement thereof along the saw, and connections between said swage and said member for forwardly advancing the swage past a saw tooth, said connections including means permitting rearward movement of the swage while said member remains stationary upon advancement of the swage past a tooth whereby the swage is free for final independent adjustment into swaging position.

7. The combination with a saw swage, a member forwardly slidable upon the saw and engageable with a tooth to prevent retrograde movement thereof along the saw, and connections between said swage and said member for forwardly advancing the swage past a saw tooth, said connections including an abutment and a pivotally mounted thrust rod engageable therewith, said thrust rod being disengageable from the abutment upon advancement of the swage past a tooth to permit rearward movement of the swage while said member remains stationary whereby the swage is free for final independent adjustment into swaging position.

RALPH V. HANCHETT.